United States Patent
Yu et al.

(10) Patent No.: US 10,972,703 B2
(45) Date of Patent: Apr. 6, 2021

(54) METHOD, DEVICE, AND STORAGE MEDIUM FOR PROCESSING WEBCAM DATA

(71) Applicant: Shanghai Xiaoyi Technology Co., Ltd., Shanghai (CN)

(72) Inventors: Lichun Yu, Shanghai (CN); Zhiyong Chen, Shanghai (CN); Hua Huang, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 64 days.

(21) Appl. No.: 16/257,245

(22) Filed: Jan. 25, 2019

(65) Prior Publication Data
US 2019/0238797 A1    Aug. 1, 2019

(30) Foreign Application Priority Data

Jan. 31, 2018    (CN) .......................... 201810095394.1

(51) Int. Cl.
*H04N 7/18* (2006.01)
*H04L 29/08* (2006.01)
(Continued)

(52) U.S. Cl.
CPC ........... *H04N 7/181* (2013.01); *G06F 1/1686* (2013.01); *G06K 9/00288* (2013.01);
(Continued)

(58) Field of Classification Search
CPC .......... H04N 7/181; H04N 7/188; H04N 7/18; G06K 9/00295; G06K 9/00771;
(Continued)

(56) References Cited

U.S. PATENT DOCUMENTS

| 6,888,565 B1 * | 5/2005 | Tanaka ............. G08B 13/19645 348/207.1 |
| 2001/0045983 A1 * | 11/2001 | Okazaki ............. H04N 5/23206 348/211.99 |

(Continued)

FOREIGN PATENT DOCUMENTS

| CN | 102098806 A | 6/2011 |
| CN | 106131185 A | 11/2016 |

(Continued)

OTHER PUBLICATIONS

CNIPA 1st Office Action for corresponding CN Application No. 201810095394.1; dated May 21, 2020.

*Primary Examiner* — Abdelaaziz Tissire
(74) *Attorney, Agent, or Firm* — Cantor Colburn LLP

(57) ABSTRACT

Methods and systems for processing webcam data are disclosed. According to some disclosed embodiments, the method includes: determining data to be processed; sending a control request to a server to request a task initiation permission for a webcam cluster; in response to an authorization instruction of the server, determining property information of each webcam in the webcam cluster; segmenting the data based on the property information of each webcam, to generate a plurality of data segments; sending each of the plurality of data segments to a corresponding webcam in the webcam cluster for processing; receiving intermediate results generated by the webcam cluster on the basis of the plurality of data segments; and combining the intermediate results into a final result.

20 Claims, 4 Drawing Sheets

(51) Int. Cl.
   *G06K 9/00*   (2006.01)
   *G06F 1/16*   (2006.01)
(52) U.S. Cl.
   CPC ..... *G06K 9/00295* (2013.01); *G06K 9/00677*
       (2013.01); *G06K 9/00771* (2013.01); *H04L*
       *67/00* (2013.01); *H04L 67/104* (2013.01)
(58) Field of Classification Search
   CPC   G06K 9/00677; G06K 9/00288; H04L 67/00;
                 H04L 67/104; H04L 67/1008; H04L
                 67/32; H04L 67/141; H04L 67/1029;
                         H04L 67/10; G06F 1/1686
   See application file for complete search history.

(56) References Cited

U.S. PATENT DOCUMENTS

| | | | |
|---|---|---|---|
| 2002/0113796 A1* | 8/2002 | Oshiyama | H04N 1/387 345/581 |
| 2003/0177241 A1* | 9/2003 | Katayama | G06F 9/5083 709/226 |
| 2004/0128563 A1* | 7/2004 | Kaushik | G06F 1/3203 713/300 |
| 2004/0201677 A1* | 10/2004 | Bronson | G08B 13/19689 348/207.1 |
| 2007/0165048 A1* | 7/2007 | Yamashita | H04N 9/67 345/601 |
| 2008/0088713 A1* | 4/2008 | Jung | H04N 5/23293 348/222.1 |
| 2009/0089782 A1* | 4/2009 | Johnson | G06F 1/324 718/100 |
| 2009/0109230 A1* | 4/2009 | Miller | G06F 9/5094 345/506 |
| 2009/0257681 A1* | 10/2009 | Matsubara | G06T 11/00 382/284 |
| 2010/0026811 A1* | 2/2010 | Palmer | G08B 13/196 348/159 |
| 2012/0050458 A1 | 3/2012 | Mauchly et al. | |
| 2014/0267811 A1* | 9/2014 | Bhat | H04N 5/23267 348/208.16 |
| 2017/0104957 A1* | 4/2017 | Farrell | G10L 17/02 |

FOREIGN PATENT DOCUMENTS

| | | |
|---|---|---|
| CN | 106686108 A | 5/2017 |
| CN | 107241577 A | 10/2017 |

* cited by examiner

METHOD, DEVICE, AND STORAGE MEDIUM FOR PROCESSING WEBCAM DATA

CROSS-REFERENCE TO RELATED APPLICATION

The disclosure claims the benefits of priority to Chinese Application No. 201810095394.1, filed on Jan. 31, 2018, which is incorporated herein by reference in its entirety.

FIELD OF TECHNOLOGY

The present disclosure relates to the field of data processing technology and, more particularly, relates to a webcam data processing method, device, storage medium, and webcam.

BACKGROUND OF THE DISCLOSURE

With the public's increasingly higher demand for personal security and public security, webcams are found on many streets and alleys throughout a city. A monitoring system composed of webcams throughout a city may record various incidents and provides valuable documentary materials for pursuing criminals and analyzing the cause of accidents. However, the deployment of a huge amount of webcams will inevitably produce a huge amount of video. Obtaining useful information from a huge amount of video will require a large amount of computation, which will in turn require robust computational capacities provided by computational devices.

The traditional process of video analysis is mainly completed on the basis of a server analysis system. The server analysis system is generally composed of a storage server, an analysis server, and a management server. First, regardless of whether the video is valid, it is necessary for webcams to transmit video data to the server analysis system. When a huge amount of webcams simultaneously upload video data, the storage server is required to have a huge storage capacity and a huge transmission bandwidth. Second, the analysis server needs to convert video data into computational tasks and decode and analyze the computational tasks to obtain process results, which are then stored on the management server. The whole process of video analysis takes a long time and places high requirements on the transmission bandwidth, storage, and computational capacity of the server.

Currently, an improved server analysis system that employs a plurality of analysis servers has appeared, first breaking down a huge video computational task into a plurality of small computational tasks, and then utilizing each analysis server for parallel processing. Although the processing speed of video analysis was accelerated, the computational cost of the server was also greatly increased.

Currently available technical solutions that employ a server to analyze video place high requirements on the storage capacity, computational capacity, and transmission bandwidth of the server.

BRIEF SUMMARY OF THE DISCLOSURE

The technical problem addressed by the present disclosure is how to lower the computational load of the server and save storage space and transmission bandwidth when performing video analysis and other data processing.

In order to address the aforementioned technical problem, one exemplary embodiment of the present invention provides a webcam data processing method performed by a processor. The method includes: determining data to be processed, sending a control request to a server to request a task initiation permission for a webcam cluster; in response to an authorization instruction of the server, determining property information of each webcam in the webcam cluster; segmenting the data to be processed on the basis of the property information of each webcam, to generate a plurality of data segments; sending each of the plurality of data segments to a corresponding webcam in the webcam cluster for processing; receiving intermediate results generated by the webcam cluster on the basis of the plurality of data segments; and combining the intermediate results into a final result.

In some embodiments, the property information includes available computational capacity and information interaction time delay.

In some embodiments, the segmenting the data to be processed on the basis of the property information of each webcam includes computing a weight coefficient for each webcam on the basis of the property information of each webcam, the weight coefficient being proportional to the available computational capacity of each webcam and inversely proportional to the information interaction time delay of each webcam; computing a computational load to be undertaken by each webcam on the basis of the weight coefficient of each webcam, the computational load being proportional to the available computational capacity of each webcam and inversely proportional to the information interaction time delay of each webcam; and segmenting the data to be processed on the basis of the computational load to be undertaken by each webcam.

In some embodiments, the final result is a feature of a person, and the data processing method further includes sending the final result to the server to determine the identity of the person by matching the final result against features of persons registered in a database.

In some embodiments, the sending each of the plurality of data segments to a corresponding webcam in the webcam cluster for processing includes performing a compression coding on each of the plurality of data segments to obtain a compressed data segment; and sending the compressed data segment to its corresponding webcam.

In some embodiments, the sending each of the plurality of data segments to a corresponding webcam in the webcam cluster for processing includes sending at least one computational module to the corresponding webcam, wherein the at least one computational module is utilized by the corresponding webcam to compute and determine the intermediate result.

In some embodiments, the sending at least one computational module to the corresponding webcam includes performing compression coding on the at least one computational module; and after the compression coding is performed, sending the at least one computational module to the corresponding webcam.

In some embodiments, the data processing method further includes receiving a cluster update instruction sent by the server, the cluster update instruction including a cluster identification and one or more webcam identifications in the cluster identification; establishing a peer-to-peer connection with webcams pointed to by the one or more webcam identifications in the cluster identification; and feeding the cluster identification back to the server.

In some embodiments, the webcam cluster includes a first webcam and one or more other webcams, and the data processing method further includes periodically sending current webcam characteristic metrics of the first webcam to the one or more other webcams in the webcam cluster, the webcam characteristic metrics indicating at least one of a working state, a network connection speed, or a bandwidth of a webcam.

In some embodiments, the data processing method further includes periodically sending to the server the current webcam characteristic metrics of the first webcam and current webcam characteristic metrics of the one or more other webcams.

In order to address the aforementioned technical problem, one exemplary embodiment of the present invention further provides a webcam data processing device. The device includes: a first determination module configured to determine data to be processed; a first sending module configured to send a control request to a server to request task initiation permission for a webcam cluster; a second determination module configured to, responsive to an authorization instruction of the server, determine the property information of each webcam in the webcam cluster; a segmentation module configured to segment the data on the basis of the property information of each webcam and send each data segment obtained from the segmentation to a corresponding webcam for processing; and a first receiving module configured to receive an intermediate result generated on the basis of the webcam's corresponding data segment by each webcam in the webcam cluster and combine the intermediate results of all the webcams into a final result.

In some embodiments, the property information includes available computational capacity and information interaction time delay.

In some embodiments, the segmentation module includes a first computation submodule configured to compute a weight coefficient for each webcam on the basis of the property information of each webcam, the weight coefficient being proportional to the available computational capacity of each webcam and inversely proportional to the information interaction time delay of each webcam; a second computation submodule configured to compute a computational load to be undertaken by each webcam on the basis of the weight coefficient of each webcam, the computational load being proportional to the available computational capacity of each webcam and inversely proportional to the information interaction time delay of each webcam; and a segmentation submodule configured to segment the data on the basis of the computational load to be undertaken by each webcam.

In some embodiments, the final result is a feature of a person, and the data processing device further includes a second sending module configured to send the final result to the server to determine the identity of the person by matching the final result against features of persons registered in a database.

In some embodiments, the segmentation module includes a compression coding submodule configured to perform compression coding on each data segment obtained from the segmentation to obtain a compressed data segment; and a first sending submodule configured to send the compressed data segment to its corresponding webcam.

In some embodiments, the segmentation module includes a second sending submodule configured to send at least one computational module in a computational model to its corresponding webcam when the data segment is being sent to its corresponding webcam, the webcam utilizing the at least one computational module to compute and determine the intermediate result.

In some embodiments, the second sending submodule includes a compression coding unit configured to perform compression coding on at least one computational module in the computational model; and a sending unit configured to send at least one computational module that has undergone compression coding to its corresponding webcam.

In some embodiments, the data processing device further includes a second receiving module configured to receive a cluster update instruction sent by the server, the cluster update instruction including at least one cluster identification and each webcam identification in the at least one cluster identification; an establishment module configured to establish a peer-to-peer connection with the webcam pointed to by each webcam identification in the at least one cluster identification; and a feedback module configured to feed the cluster identification back to the server, the cluster identification being used to indicate the webcam cluster.

In some embodiments, the data processing device further includes a third sending module configured to periodically send the current state of webcam characteristic metrics to other webcams in the webcam cluster, the webcam characteristic metrics being used to indicate at least one of the following: the working state of the webcam, the network connection speed, and the bandwidth.

In some embodiments, the data processing device further includes a fourth sending module configured to periodically send to the server the current state of the webcam characteristic metrics and the state of webcam characteristic metrics of other webcams in the webcam cluster.

In order to address the aforementioned technical problem, one exemplary embodiment of the present invention further provides a storage medium on which a computer instruction is stored, the steps of the webcam data processing method above being executed when the computer instruction is run.

In order to address the aforementioned technical problem, one exemplary embodiment of the present invention further provides a webcam including a storage device and a processor, the storage device storing a computer instruction that can be run on the processor and the steps of the webcam data processing method above being executed when the processor runs the computer instruction.

In comparison with currently available technology, the technical solution provided by exemplary embodiments of the present invention has the following benefits:

one exemplary embodiment of the present invention provides a webcam data processing method including: determining data to be processed; sending a control request to a server to request task initiation permission for a webcam cluster; responsive to an authorization instruction of the server, determining the property information of each webcam in the webcam cluster; segmenting the data on the basis of the property information of each webcam and sending each data segment obtained from the segmentation to a corresponding webcam for processing; and receiving an intermediate result generated on the basis of the webcam's corresponding data segment by each webcam in the webcam cluster and combining the intermediate results of all the webcams into a final result. In this exemplary embodiment of the present invention, data processing tasks may be distributed to each webcam cluster, and idle or relatively idle webcams are utilized to complete video analysis, thus reducing data transmission between a webcam and a server and greatly lowering the bandwidth cost of the server; further, the server's storage consumption and data computational load may also be reduced.

Further, the segmenting the data on the basis of the property information of each webcam includes computing a weight coefficient for each webcam on the basis of the property information of each webcam, the weight coefficient being proportional to the available computational capacity of each webcam and inversely proportional to the information interaction time delay of each webcam; computing a computational load to be undertaken by each webcam on the basis of the weight coefficient of each webcam, the computational load being proportional to the available computational capacity of each webcam and inversely proportional to the information interaction time delay of each webcam; and segmenting the data on the basis of the computational load to be undertaken by each webcam. The data to be processed may be rationally segmented on the basis of the property information of each webcam such as the available computational capacity and information interaction time delay, thereby shortening the processing time delay to satisfy time delay requirements for data processing.

Further, the sending each data segment obtained from the segmentation to a corresponding webcam for processing includes: performing compression coding on each data segment obtained from the segmentation to obtain a compressed data segment; and sending the compressed data segment to its corresponding webcam. By performing compression coding on the data segment, the expense of network bandwidth may be lowered.

It is to be understood that both the foregoing general description and the following detailed description are exemplary and explanatory only and are not restrictive of the disclosed embodiments, as claimed.

DETAILED DESCRIPTION OF THE DISCLOSURE

As stated in the Background of the disclosure section, currently available technical solutions simply rely on a server to process video data, and the computational cost, storage cost, and bandwidth cost of the server are all high.

The inventor of the present application has discovered through careful analysis that idle webcams distributed on a network may form webcam clusters and video analysis and other data processing tasks may be distributed to webcam clusters for processing by the webcam clusters.

One exemplary embodiment of the present disclosure provides a webcam data processing method including: determining data to be processed; sending a control request to a server to request task initiation permission for a webcam cluster; responsive to an authorization instruction of the server, determining the property information of each webcam in the webcam cluster; segmenting the data on the basis of the property information of each webcam and sending each data segment obtained from the segmentation to a corresponding webcam for processing; and receiving an intermediate result generated on the basis of the webcam's corresponding data segment by each webcam in the webcam cluster and combining the intermediate results of all the webcams into a final result. In this exemplary embodiment of the present disclosure, data processing tasks may be distributed to each webcam cluster, and idle webcams may be utilized to complete video analysis, thus reducing data transmission between a webcam and a server and greatly lowering the bandwidth cost of the server; further, the server's storage consumption and data computational load may also be reduced.

In order to make the aforementioned purposes, characteristics, and benefits of the present disclosure more evident and easier to understand, detailed descriptions of specific exemplary embodiments of the present disclosure are provided below with reference to the drawings attached.

Figure 1:
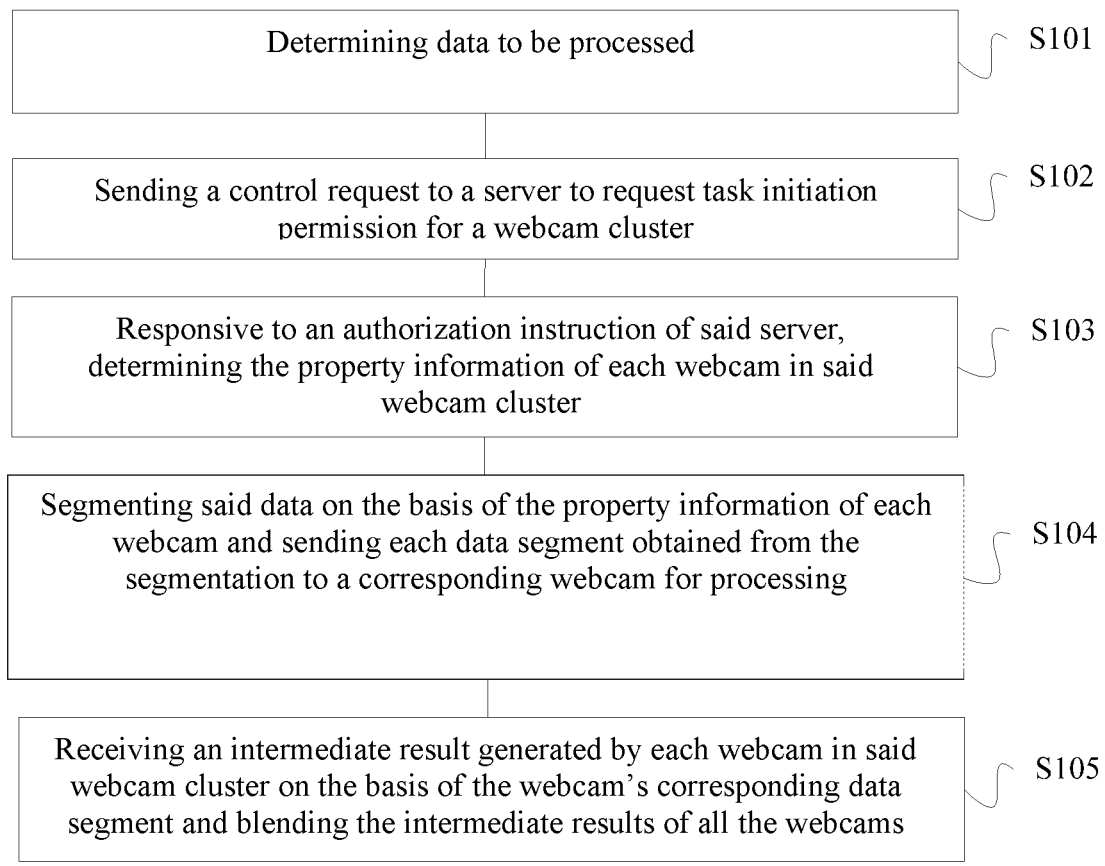
FIG. 1 is a flowchart of a webcam data processing method, according to an exemplary embodiment of the present disclosure.

FIG. 1 is a flowchart of a webcam data processing method 100, according to an exemplary embodiment of the present disclosure. The data processing method 100 may enable a webcam to complete, on the basis of a webcam cluster, video analysis such as video summarization and identity authentication and other data processing. The webcam cluster refers to a cluster formed with a plurality of webcams that may perform peer-to-peer communication on the Internet and whose connection bandwidth satisfies preset requirements.

Specifically, the webcam cluster may be indicated by a cluster identification indicator, and a single cluster identification may uniquely indicate a single webcam cluster. A webcam cluster may include a plurality of webcams, and each webcam in the webcam cluster has common characteristic metrics such as network characteristic metrics and webcam characteristic metrics. The network characteristic metrics may include a webcam's region property, network supported peer-to-peer connection, and webcam model and version, etc. The webcam characteristic metrics may include the working state of the webcam, the network connection speed, and the bandwidth.

In one specific embodiment, before a webcam utilizes a webcam cluster for data processing, the webcam cluster needs to be established. Establishing the webcam cluster may include the following steps: first, the webcam may send at least one webcam characteristic metric to a server so that the server may determine a characteristic code word of the webcam on the basis of common characteristic metrics such as existing network characteristic metrics and received webcam characteristic metrics; second, through information exchange between the webcam and the server, the webcam may confirm its own characteristic code word; third, on the basis of the current state of its own webcam characteristic metrics, the webcam may send a cluster formation request to the server; the server may store, in the chronological order in which each cluster formation request is sent, information about each webcam that has sent a cluster formation request; then, the server may push a cluster handshake instruction to a plurality of specific webcams that have an identical characteristic code word; if the cluster handshake instruction sent by the server is received by the webcam, then the webcam may establish a peer-to-peer connection with other webcams in the cluster handshake instruction; here, the cluster handshake instruction may include a cluster identification and at least a preset quantity of webcam identifications pointing to the other webcams; finally, if the webcam may perform peer-to-peer connection with a preset quantity (e.g., 3 to 5) of other webcams, then the webcam may feed the cluster identification back to the server so that the server determines the webcam cluster after receiving a preset quantity of the cluster identification. The server may maintain the webcam cluster indicated by the cluster identification indicator.

After determining the webcam cluster, a webcam in the webcam cluster may request, through the server, other webcams in the webcam cluster to process data. Specifically, the webcam data processing method 100 may include the following steps: Step S101: determining data to be processed; Step S102: sending a control request to a server to request task initiation permission for a webcam cluster; Step 103: responsive to an authorization instruction of the server, determining the property information of each webcam in the webcam cluster; Step S104: segmenting the data on the basis of the property information of each webcam and sending each data segment obtained from the segmentation to a corresponding webcam for processing; Step S105: receiving an intermediate result generated by each webcam in the webcam cluster on the basis of the webcam's corresponding data segment and combining the intermediate results of all the webcams into a final result.

Specifically, in Step S101, the webcam first determines data to be processed by a webcam cluster. The data to be processed may be video or other data. Data processing may be video analysis, e.g., completion of target tracking on the basis of a video, target detection in a video, or summarization of a video.

For example, video summarization may be regarded as a simplified computation of a huge volume of data. Video summarization is performing enrichment and extraction of a video, removing redundant information in the video, extracting the main content of the video, and obtaining a video summary to satisfy a user's needs such as previews and queries; it does not have high real-time requirements.

For another example, target detection may be regarded as a complex computation focused on a single datum to authenticate a person's identity or other information; it has higher real-time requirements.

In Step S102, after the webcam determines the data to be processed, the webcam may send a control request to a server to obtain the resources and permission for a webcam cluster from the server, i.e., obtain task initiation permission so that the webcam may utilize the webcam cluster to process the data to be processed.

If the server receives control requests sent by a plurality of webcams in the same webcam cluster, then the server may select one of the webcams randomly or select one webcam on the basis of the chronological order in which the control requests were received, and the resources and permission for the webcam cluster are conferred to the webcam by means of sending an authorization instruction.

In Step S103, once the webcam has received the authorization instruction sent by the server, i.e., after the webcam obtains the control permission for the webcam cluster, the webcam may further learn from the server property information, such as available computational capacity and information interaction time delay, of other webcams in the webcam cluster. The available computational capacity may be learned by querying other webcams; the information interaction time delay may be determined by computing the data interaction time between the webcam and other webcams.

In Step S104, the webcam computes a weight coefficient for each webcam on the basis of the obtained available computational capacity and information interaction time delay of each webcam in the webcam cluster to determine the computational load to be undertaken by each webcam.

As a non-limiting exemplary embodiment, before the webcam segments the data to be processed, the webcam may determine the weight coefficients on the basis of the available computational capacity of each webcam and the information interaction time delay of each webcam. For example, the weight coefficient may be proportional to the available computational capacity of each webcam and inversely proportional to the information interaction time delay of each webcam, i.e., $$\alpha_i = \frac{C_i}{N_i}$$

(a is a positive integer). Here, $\alpha_i$ is the weight coefficient of the computational load corresponding to the i-th webcam, $C_i$ is the available computational capacity of the i-th webcam, and $N_i$ is the information interaction time delay between the i-th webcam and the webcam. The computational load to be undertaken by the i-th webcam may be expressed as $$L_i = \frac{\alpha_i \cdot L}{Z},$$

as where Z is the normalization constant, $$Z = \sum_i^n \alpha_i,$$

and L is the total computational load.

Then, on the basis of the computational load to be undertaken by each webcam, the webcam may segment the data to be processed to obtain each data segment. The webcam may send each data segment to its corresponding webcam so that each webcam may process its corresponding data segment respectively.

As one exemplary embodiment, when sending a data segment to its corresponding webcam, the webcam may send the data segment only, or the webcam may also send along to the corresponding webcam a computational model that processes the data segment or at least one computational module in the computational model.

Persons having ordinary skill in the art understand that in specific embodiments, each webcam may possibly include and may possibly not include a computational model or a computational module in the computational model (a computational module may include a computational parameter). If a webcam does not have a computational model (including a plurality or all computational modules and computational parameters) or a computational module, there are two ways for this webcam to obtain a computational model or at least one computational module. In one way, a computational model to be used for the computational load to be undertaken by this webcam (e.g., at least one computational module (including computer parameters) is received from the task initiation webcam. In another way, the task initiation webcam sends only the data segment to be processed and the computational load to be undertaken while unable to obtain the computational model from the task initiation webcam; in this case, the webcam may broadcast the needed computational model in the webcam cluster and obtain the needed computational model from the webcam that has the shortest interaction time delay.

Further, for different computational tasks, the computational model exists in different forms in the webcams. For example, in video summarization, the computational task of each webcam has equal weight, and each webcam may save a complete copy of the computational model, i.e., each webcam may utilize the same computational model for processing different data. For another example, in identity authentication, each webcam corresponds to a part of the computational task respectively, and each webcam may save only a computational module of the corresponding computational model, i.e., the webcams utilize different computational modules to process the same data.

As one example embodiment, in order to lower network bandwidth expenses, a webcam may perform compression coding on data segments that have undergone segmentation, and then the data segments that have undergone compression coding are sent to other webcams in the webcam cluster. The webcam may send along a computational model or a computational module in the computational model; in this case, the webcam may also perform compression coding on the computational model or the computational module, and send the computational model or computational module that have undergone compression coding along with the data segments that have undergone compression coding to the other webcams.

As another exemplary embodiment, in order to fully utilize the available computational capacity of each webcam, each webcam may opt to simplify the computational model to reduce computational load and processing time delay, as long as the influence of such simplification on the computational performance of the computational model is within an acceptable range.

In Step S105, after each webcam in the webcam cluster has received its corresponding data segment, the data segment may be processed on the basis of an existing computational model or a received computational model or the computational module in the computational model to produce an intermediate result. Then, the webcam may feed the intermediate result back to the task initiation webcam (i.e., the webcam that initiated the computational task).

Further, if the webcam receives the intermediate result fed back from each webcam in the webcam cluster, then the intermediate results of all the webcams may be combined into a final result sequentially.

As an application scenario, the computational task of video summarization is used to describe a data processing process on the basis of a webcam cluster.

In one embodiment, first, the webcam that is the task initiation node sends the control request for processing video data. If the webcam obtains from the server the task initiation permission for the webcam cluster, then while the video data is being processed, the server will ensure that only the data processing tasks of this webcam are in the same webcam cluster; at the same time, while the data is being processed, the server may further lock the webcam cluster and not permit a new webcam to join the webcam cluster.

Second, after the webcam obtains from the server the task initiation permission for the webcam cluster, the webcam obtains the video summarization computational load to be undertaken by each webcam on the basis of the property information of the other webcams, and the webcam segments the video data and determines each video data segment. If the other webcams do not have a computational model, then the webcam further needs to send a computational model.

Third, the webcam sends each video data segment (and the computational model) to its corresponding webcam in the webcam cluster. The webcam may perform compression coding and transmission on the video data segment and the computational module. The webcam may log each video data segment and its corresponding webcam for subsequent combining of the intermediate results.

Then, each webcam performs computation on its assigned video data segment. It should be noted that when performing video summarization, each webcam may save a copy of the computational model, and each webcam may compute independently; for example, the computational model may be a long short-term memory (LSTM) model. When each webcam uses the LSTM model to process its video data segment, the webcam may utilize the LSTM model to score and judge the richness of each frame in the video data segment.

Then, after completing the computation on the video data segment, each webcam may transmit the computed result back to the task initiation webcam.

Finally, after all computed results are received, the task initiation webcam may notify the server to terminate computation. Furthermore, the task initiation webcam may perform further processing on each computed result to obtain the final result.

As another application scenario, the computational task of identity authentication is used to describe a data processing process on the basis of a webcam cluster.

In one embodiment, first, by sending a control request the task initiation webcam obtains from the server the task initiation permission for determining the webcam cluster.

Second, the webcam obtains the video computational load to be undertaken by each webcam on the basis of the property information of the other webcams, and the webcam segments the video task and determines each video data segment. Furthermore, the webcam may segment the computational model to obtain computational modules.

Third, the webcam sends each video data segment along with the computational module to their corresponding webcam in the webcam cluster. The webcam may perform compression coding and transmission on the video data segment and the computational module. The webcam may log each video data segment and its corresponding webcam for subsequent combining of the intermediate results.

Then, each webcam obtains a computational model (including computational parameters) on the basis of its assigned computational task for processing. For example, the task initiation webcam performing identity authentication may divide the computational model into two parts: facial matching and body proportion matching. For the facial part, the task initiation webcam may assign a portion of the webcams in the webcam cluster to compute a plurality of different computational models (for example, auto-encoder features on the basis of deep learning, Siamese Network features, etc.), and assign another portion of the webcams a computational model (or at least one computational module in the computational model) for facial feature point detection. For the body proportion part, the task initiation webcam assigns the other webcams to detect certain key information about the body.

Then, after completing the computation on the video data segment, each webcam may transmit the computed result back to the task initiation webcam.

Finally, after all computed results are received, the task initiation webcam may notify the server to terminate computation. Then, the task initiation webcam may perform further processing on each computed result to obtain the final result. For example, the task initiation webcam may perform further processing on the received facial and body proportion features to obtain the final result and then send the final result to the server, which may match the final result against features of persons registered in a database on the server, thereby determining the identity of the person.

As one example embodiment, for a complex computational task, the webcam may further perform hierarchical processing on the data to be processed. For example, a multi-layer webcam cluster may be established; the task initiation webcam may segment data to be processed to obtain raw data segments and utilize the bottom-layer webcams in the multi-layer webcam cluster for processing to generate a first-layer intermediate result. Then, the first-layer intermediate result, as data to be processed, is re-segmented and processed by the webcams at one layer above (higher) to produce a second-layer intermediate result; this process is repeated until the final result is produced.

As one example variation, for a complex computational task, the webcam may also utilize a plurality of webcam clusters to compute data to be processed. For example, the task initiation webcam segments data to be processed into a plurality of data segments, sends them to webcams in a plurality of webcam clusters for processing, receives intermediate results from a plurality of webcam clusters, and combines the intermediate results into the final result.

It should be noted that, in a practical application, not only a webcam in a webcam cluster may utilize the webcam cluster to process data, a server may also utilize the webcam cluster to process data.

Figure 2:
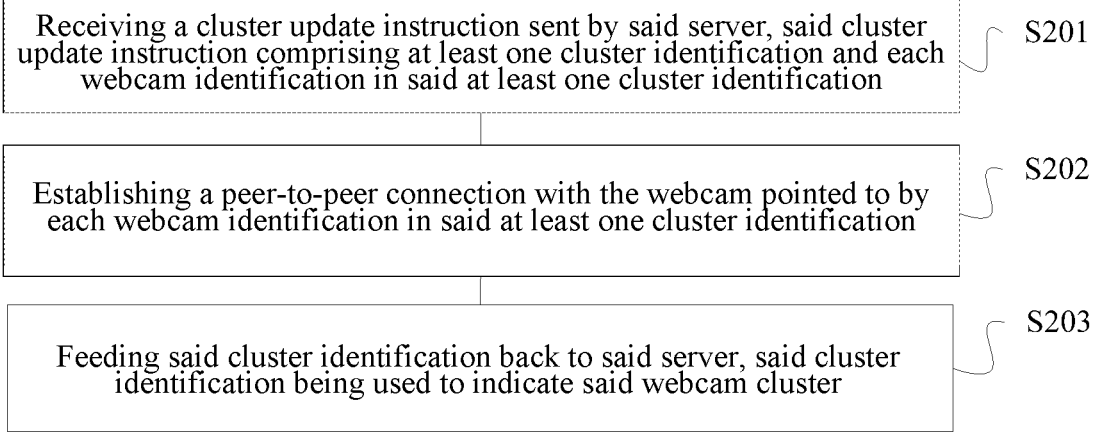
FIG. 2 is a flowchart of another webcam data processing method, according to an exemplary embodiment of the present disclosure.

FIG. 2 is a flowchart of a webcam data processing method 200, according to an exemplary embodiment of the present disclosure. The data processing method 200 may include the following steps:

Step S201: receiving a cluster update instruction sent by the server, the cluster update instruction including at least one cluster identification and each webcam identification in the at least one cluster identification.

Step S202: establishing a peer-to-peer connection with the webcam pointed to by each webcam identification in the at least one cluster identification.

Step S203: feeding the cluster identification back to the server, the cluster identification being used to indicate the webcam cluster.

Specifically, considering the possibility of a webcam becoming disconnected due to loss of power or other reasons, or the possibility of a webcam being in a busy state due to a relatively high load, it may be difficult for the webcam to undertake video analysis or other data processing tasks; consequently, the webcam cluster may dynamically remove a disconnected or busy webcam or have a new webcam join. When the server discovers that the quantity of webcams in a webcam cluster is less than a first preset threshold value (e.g., the quantity of webcams is less than 3), the server may dissolve the webcam cluster.

In Step S201, when the server discovers that the quantity of webcams in a webcam cluster is less than a second preset threshold value (e.g., the quantity of webcams is less than 5), i.e. when the webcam cluster has not reached a saturated state, the server may, after receiving a cluster formation request sent by a webcam, send the cluster update instruction to the webcam; the cluster update instruction may include one cluster identification and each webcam identification in the cluster identification, or the cluster update instruction may include a plurality of cluster identifications and each webcam identification in each of the cluster identifications. After receiving the cluster update instruction, the webcam may learn the webcam cluster to join and the webcams included in the webcam cluster.

In Step S202, the webcam may exchange information with the webcam pointed to by each webcam identification in the webcam cluster to establish a peer-to-peer connection. If the webcam cannot establish a peer-to-peer connection with one or a plurality of webcams in the webcam cluster, then the webcam cannot join the webcam cluster. If the cluster update instruction received by the webcam includes another webcam cluster identification, then the webcam may successively attempt to establish a peer-to-peer connection with webcams in this other webcam cluster.

In Step S203, if the webcam successfully establishes peer-to-peer connections with all of the webcams in one webcam cluster, then the webcam may send the cluster identification of this webcam cluster to the server to notify the server of the successful joining of the webcam cluster.

Each webcam in the webcam cluster may periodically send its own webcam characteristic metrics to other webcams in the webcam cluster to feed back its current state. Here, the webcam characteristic metrics may include the working state of the webcam, the network connection speed, and the bandwidth. For example, the webcam characteristic metrics may indicate whether the webcam is idle, still connected, or still in the webcam cluster. If a certain webcam is disconnected or is in a busy state, then another webcam node cannot receive the webcam characteristic metrics of this webcam.

Each webcam in the webcam cluster may further periodically send the current state of its webcam characteristic metrics to the server, as well as the current state of the webcam characteristic metrics of other webcams. When a certain webcam is disconnected or is in a busy state, and other webcams in the webcam cluster have not received the webcam characteristic metrics sent by that webcam within a certain time period, then the webcam characteristic metrics of that webcam may be sent to the server. Further, when the server receives that a certain webcam is already disconnected with a preset quantity of webcams, the server may remove the web cam.

As described above, the technical solution provided by this exemplary embodiment of the present disclosure may perform video analysis and other data processing in a webcam cluster, greatly lowering the server's bandwidth cost, storage cost, and data computational cost.

Figure 3:
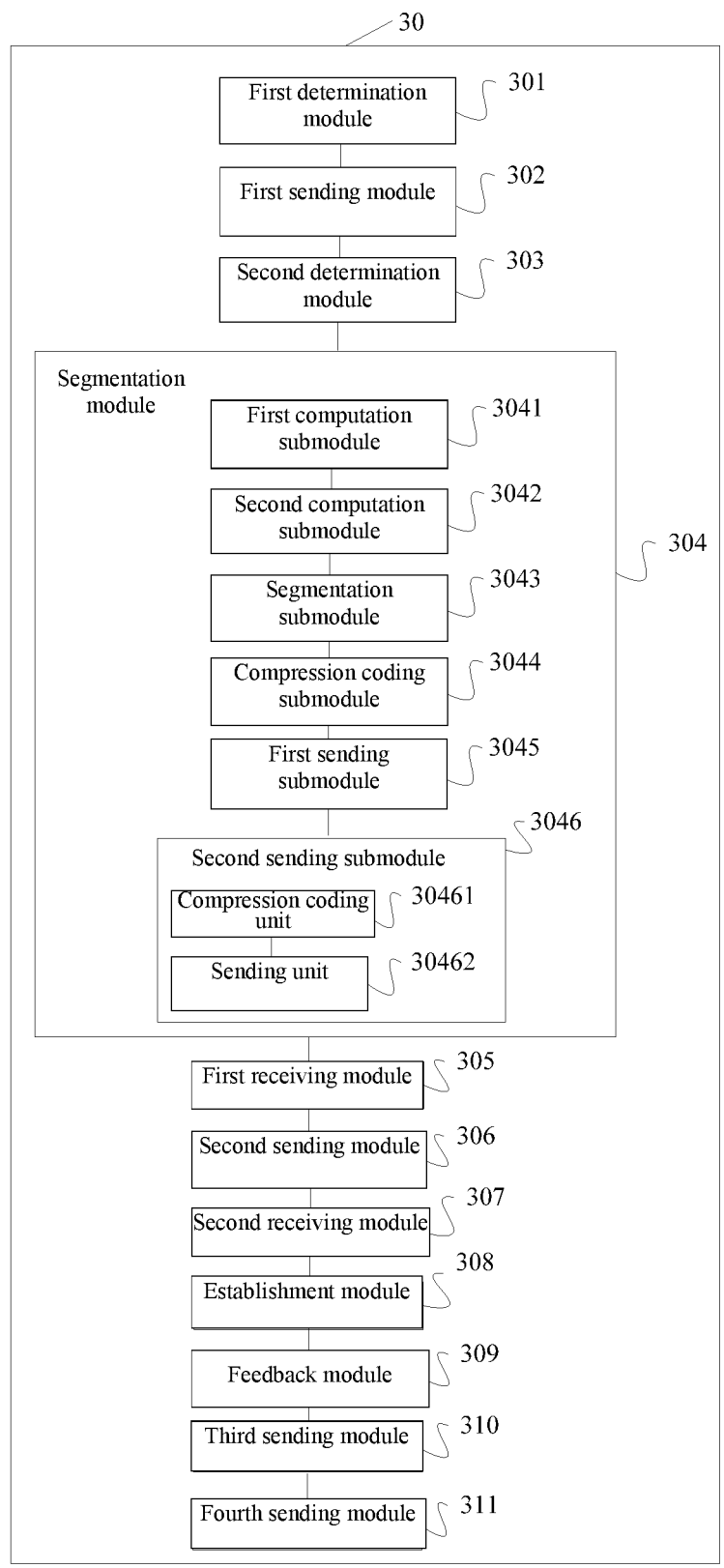
FIG. 3 is a block diagram of a webcam data processing device, according to an exemplary embodiment of the present disclosure.

FIG. 3 is a block diagram of a webcam data processing device 30, according to an exemplary embodiment of the present disclosure, which may be used to implement the technical solution of the above webcam data processing method.

Specifically, the webcam data processing device 30 may include: a first determination module 301, a first sending module 302, a second determination module 303, a segmentation module 304, and a first receiving module 305.

Further, the first determination module 301 is configured to determine data to be processed; the first sending module 302 is configured to send a control request to a server to request task initiation permission for a webcam cluster; the second determination module 303 is configured to, responsive to an authorization instruction of the server, determine the property information of each webcam in the web cam cluster; the segmentation module 304 is configured to segment the data on the basis of the property information of each webcam and send each data segment obtained from the segmentation to a corresponding webcam for processing; the first receiving module 305 is configured to receive an intermediate result generated on the basis of the webcam's corresponding data segment by each webcam in the webcam cluster and combine the intermediate results of all the webcams into a final result. Here, the property information may include: available computational capacity and information interaction time delay.

As a non-limiting exemplary embodiment, the segmentation module 304 may include a first computation submodule 3041, a second computation submodule 3042, and a segmentation submodule 3043.

In one specific embodiment, the first computation submodule 3041 is configured to compute a weight coefficient for each webcam on the basis of the property information of each webcam, the weight coefficient being proportional to the available computational capacity of each webcam and inversely proportional to the information interaction time delay of each webcam; the second computation submodule 3042 is configured to compute a computational load to be undertaken by each webcam on the basis of the weight coefficient of each webcam, the computational load being proportional to the available computational capacity of each webcam and inversely proportional to the information interaction time delay of each webcam; and the segmentation submodule 3043 is configured to segment the data on the basis of the computational load to be undertaken by each webcam.

As one exemplary embodiment, the segmentation module 304 may include: a compression coding submodule 3044 and a first sending submodule 3045. The compression coding submodule 3044 is configured to perform compression coding on each data segment obtained from the segmentation to obtain a compressed data segment; and the first sending submodule 3045 is configured to send the compressed data segment to its corresponding web cam.

As another exemplary embodiment, the segmentation module 304 may include: a second sending submodule 3046. The second sending submodule 3046 is configured to send at least one computational module in a computational model to its corresponding webcam when the data segment is being sent to its corresponding webcam, the webcam utilizing the at least one computational module to compute and determine the intermediate result.

In one specific embodiment, the second sending submodule 3046 may include a compression coding unit 30461 and a sending unit 30462.

Further, the compression coding unit 30461 is configured to perform compression coding on at least one computational module in the computational model; the sending unit 30462 is configured to send at least one computational module that has undergone compression coding to its corresponding webcam.

The final result is a feature of a person, and the data processing device 30 may further include a second sending module 306. The second sending module 306 is configured to send the final result to the server to determine the identity of the person by matching the final result against features of persons registered in a database.

Further, the data processing device 30 may further include a second receiving module 307, an establishment module 308, and a feedback module 309.

Specifically, the second receiving module 307 is configured to receive a cluster update instruction sent by the server, the cluster update instruction including at least one cluster identification and a plurality of the webcam identifications in the at least one cluster identification; the establishment module 308 is configured to establish peer-to-peer connections with a webcam pointed to by a plurality of webcam identifications in the at least one cluster identification; and the feedback module 309 is configured to feed the cluster identification back to the server, the cluster identification being used to indicate the webcam cluster.

Further, the data processing device 30 may further include a third sending module 310. The third sending module 310 is configured to periodically send the current state of webcam characteristic metrics to other webcams in the webcam cluster, the webcam characteristic metrics being used to indicate at least one of the following: the working state of the webcam, the network connection speed, and the bandwidth.

Further, the data processing device 30 may further include a fourth sending module 311. The fourth sending module 311 is configured to periodically send to the server the current state of the webcam characteristic metrics and the state of webcam characteristic metrics of other webcams in the webcam cluster.

Please refer to the relevant descriptions in FIG. 1 and FIG. 2 above for more information on the principles and ways of operating for the data processing device 30. Such descriptions will not be repeated here.

Further, one exemplary embodiment of the present disclosure further discloses a storage medium on which a computer instruction is stored; the technical solution of the webcam data processing methods in the exemplary embodiments illustrated in FIG. 1 and FIG. 2 above is executed when the computer instruction is run. The storage medium may include a computer-readable storage medium such as a non-volatile storage device or a non-transitory storage device. The computer-readable storage medium may include a ROM, a RAM, a magnetic disk, or an optical disc, etc.

Further, one exemplary embodiment of the present disclosure further discloses a webcam that includes a storage device and a processor; the storage device stores a computer instruction that can be run on the processor, and the technical solution of the webcam data processing methods in the exemplary embodiments illustrated in FIG. 1 and FIG. 2 above is executed when the processor runs the computer instruction.

Figure 4:
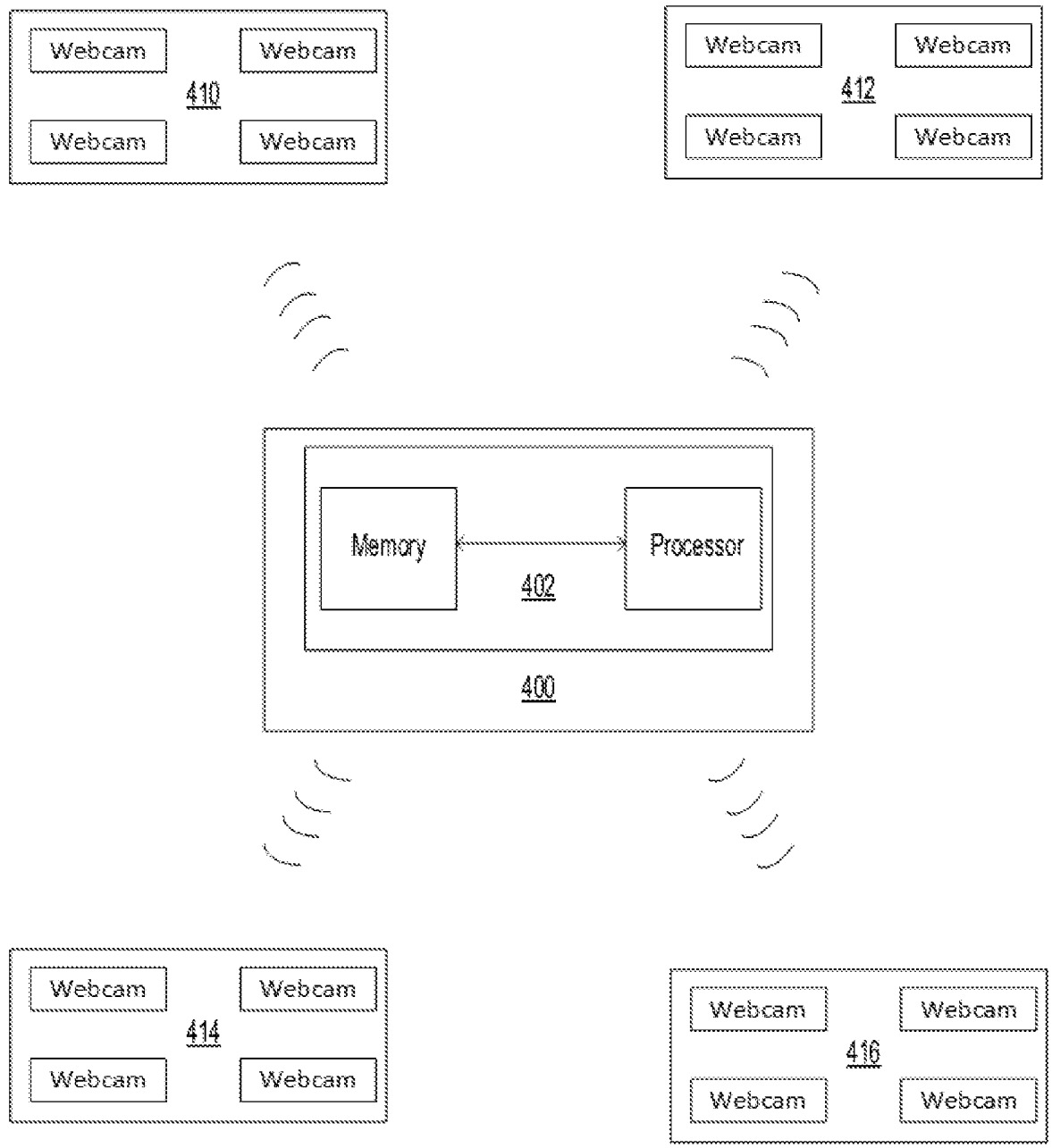
FIG. 4 is a block diagram of a webcam data processing device, according to an exemplary embodiment of the present disclosure.

FIG. 4 shows a webcam processing device 400 having a controller 402 having a memory and a processor. The webcam processing device 400 is in communication with a number of webcam clusters (e.g. webcam clusters 410, 412, 414, 416). The webcam clusters (e.g. webcam clusters 410, 412, 414, 416) may include a number of webcams, and it is to be appreciated that, although four webcams are shown in webcam clusters 410, 412, 414, 416, the webcam clusters are not limited to this number of webcams.

Notwithstanding the above disclosure, the present disclosure is not limited thereby. Any person having ordinary skill in the art may make various alterations and changes that are not detached from the essence and scope of the present disclosure; therefore, the scope of protection for the present disclosure should be that as defined by the claims.

What is claimed is:

1. A webcam data processing method performed by a processor, the method comprising:
   determining, at a webcam, data to be processed;
   sending, at the webcam, a control request to a server to request a task initiation permission for a webcam cluster;
   in response to an authorization instruction of the server, acquiring, at the webcam, property information of each webcam in the webcam cluster from the server;
   segmenting, at the webcam, the data to be processed on the basis of the property information of each webcam, to generate a plurality of data segments;

sending, at the webcam, each of the plurality of data segments to a corresponding webcam in the webcam cluster for processing;

receiving, at the webcam, intermediate results generated by the webcam cluster on the basis of the plurality of data segments; and combining, at the webcam, the intermediate results into a final result.

2. The data processing method of claim 1, wherein the property information comprises available computational capacity and information interaction time delay.

3. The data processing method of claim 2, wherein the segmenting the data to be processed on the basis of the property information of each webcam comprises:

computing a weight coefficient for each webcam on the basis of the property information of each webcam, the weight coefficient being proportional to the available computational capacity of each webcam and inversely proportional to the information interaction time delay of each webcam;

computing a computational load to be undertaken by each webcam on the basis of the weight coefficient of each webcam, the computational load being proportional to the available computational capacity of each webcam and inversely proportional to the information interaction time delay of each webcam; and segmenting the data to be processed on the basis of the computational load to be undertaken by each webcam.

4. The data processing method of claim 1, wherein the final result is a feature of a person and the method further comprises:

sending the final result to the server to determine the identity of the person by matching the final result against features of persons registered in a database.

5. The data processing method of claim 1, wherein the sending each of the plurality of data segments to a corresponding webcam in the webcam cluster for processing comprises:

performing compression coding on each of the plurality of data segments to obtain a compressed data segment; and sending the compressed data segment to the corresponding webcam.

6. The data processing method of claim 1, wherein the sending each of the plurality of data segments to a corresponding webcam in the webcam cluster for processing comprises:

sending at least one computational module to the corresponding webcam, wherein the at least one computational module is utilized by the corresponding webcam to compute and determine the intermediate result.

7. The data processing method of claim 6, wherein the sending the at least one computational module to the corresponding webcam comprises:

performing compression coding on the at least one computational module; and after the compression coding is performed, sending the at least one computational module to the corresponding webcam.

8. The data processing method of claim 1, wherein the method further comprises:

receiving a cluster update instruction sent by the server, the cluster update instruction including a cluster identification and one or more webcam identifications in the cluster identification;

establishing a peer-to-peer connection with webcams pointed to by the one or more webcam identifications in the cluster identification; and feeding the cluster identification back to the server.

9. The data processing method of claim 1, wherein the webcam cluster includes a first webcam and one or more other webcams, and the method further comprises:

periodically sending current webcam characteristic metrics of the first webcam to the one or more other webcams in the webcam cluster, the webcam characteristic metrics indicating at least one of a working state, a network connection speed, or a bandwidth of a webcam.

10. The data processing method of claim 9, wherein the method further comprises:

periodically sending to the server the current webcam characteristic metrics of the first webcam and current webcam characteristic metrics of the one or more other webcams.

11. A webcam data processing device mounted on a webcam, wherein the device comprises:

a memory storing instructions; and a processor configured to execute the instructions to:

determine data to be processed;

send a control request to a server to request a task initiation permission for a webcam cluster;

in response to an authorization instruction of the server, acquire a property information of each webcam in the webcam cluster from the server;

segment the data to be processed on the basis of the property information of each webcam, to generate a plurality of data segments;

send each of the plurality of data segments to a corresponding webcam in the webcam cluster for processing;

receive intermediate results generated by the webcam cluster on the basis of the plurality of data segments; and combine the intermediate results of all the webcams into a final result.

12. The data processing device of claim 11, wherein the property information comprises available computational capacity and information interaction time delay.

13. The data processing device of claim 12, wherein the processor is further configured to execute the instructions to:

compute a weight coefficient for each webcam on the basis of the property information of each webcam, the weight coefficient being proportional to the available computational capacity of each webcam and inversely proportional to the information interaction time delay of each webcam;

compute a computational load to be undertaken by each webcam on the basis of the weight coefficient of each webcam, the computational load being proportional to the available computational capacity of each webcam and inversely proportional to the information interaction time delay of each webcam; and segment the data to be processed on the basis of the computational load to be undertaken by each webcam.

14. The data processing device of claim 11, wherein the final result is a feature of a person and the processor is further configured to execute the instructions to:

send the final result to the server to determine the identity of the person by matching the final result against features of persons registered in a database.

15. The data processing device of claim 14, wherein the webcam cluster includes a first webcam and one or more other webcams, and the processor is further configured to execute the instructions to:

periodically send current webcam characteristic metrics of the first webcam to the one or more other webcams in the webcam cluster, the webcam characteristic metrics indicating at least one of a working state, a network connection speed, or a bandwidth of a webcam.

16. The data processing device of claim 11, wherein the processor is further configured to execute the instructions to:

perform compression coding on each of the plurality of data segments to obtain a compressed data segment; and send the compressed data segment to a corresponding webcam in the webcam cluster.

17. The data processing device of claim 11, wherein in sending each of the plurality of data segments to a corresponding webcam in the webcam cluster, the processor is further configured to execute the instructions to:

send at least one computational module to the corresponding webcam in the webcam cluster, wherein the at least one computational module is utilized by the corresponding webcam to compute and determine the intermediate result.

18. The data processing device of claim 17, wherein the processor is further configured to execute the instructions to:

perform compression coding on the at least one computational module; and after the compression coding is performed, send at least one computational module to the corresponding webcam.

19. The data processing device of claim 11, wherein the processor is further configured to execute the instructions to:

receive a cluster update instruction sent by the server, the cluster update instruction including a cluster identification and one or more webcam identifications in the cluster identification;

establish a peer-to-peer connection with webcams pointed to by the one or more webcam identifications in the cluster identification; and feed the cluster identification back to the server.

20. A non-transitory computer-readable medium comprising instructions that, when executed by a processor mounted on a webcam, cause the processor to perform a method for processing webcam data, the method comprising:

determining data to be processed;

sending a control request to a server to request a task initiation permission for a webcam cluster;

in response to an authorization instruction of the server, acquiring property information of each webcam in the webcam cluster from the server;

segmenting the data to be processed on the basis of the property information of each webcam, to generate a plurality of data segments;

sending each of the plurality of data segments to a corresponding webcam in the webcam cluster for processing;

receiving intermediate results generated by the webcam cluster on the basis of the plurality of data segments; and combining the intermediate results into a final result.

* * * * *